United States Patent [19]

Palmer et al.

[11] Patent Number: 4,810,292
[45] Date of Patent: * Mar. 7, 1989

[54] INK COMPOSITIONS FOR INK-JET PRINTERS

[75] Inventors: Donald J. Palmer, San Diego; Adrienne R. Meuter, Encinitas, both of Calif.

[73] Assignee: Hewlett-Packard Company, Palo Alto, Calif.

[*] Notice: The portion of the term of this patent subsequent to Aug. 11, 2004 has been disclaimed.

[21] Appl. No.: 134,648

[22] Filed: Dec. 17, 1987

Related U.S. Application Data

[63] Continuation of Ser. No. 866,728, May 27, 1986, abandoned, which is a continuation-in-part of Ser. No. 806,729, Dec. 5, 1985, abandoned.

[51] Int. Cl.$^4$ .............................................. C09D 11/00
[52] U.S. Cl. .......................................... 106/23; 106/22
[58] Field of Search ..................................... 106/22, 23

[56] References Cited

U.S. PATENT DOCUMENTS 4,409,040 10/1983 Tabayashi et al. ................. 106/22
4,508,570 4/1985 Fujii et al. .......................... 106/22
4,685,968 8/1987 Palmer ............................... 106/22

FOREIGN PATENT DOCUMENTS 123208 10/1978 Japan ................................. 106/22
460146 1/1937 United Kingdom ............... 564/292

Primary Examiner—Theodore Morris
Attorney, Agent, or Firm—William J. Bethurum

[57] ABSTRACT

An aqueous-based ink composition for use in ink-jet printers in disclosed. The composition comprises (a) a vehicle of about 5 to 95% water and the balance at least one glycol ether, such as diethylene glycol; (b) a dye, such as Food Black 2, having at least one negatively charged functional group per molecule, present in an amount up to about 10% of the vehicle composition; and (c) a cationic compound selected from the group consisting of alkanol ammonium compounds and cationic amide compounds, present in an amount such that there is at least one molecule of cationic compound for at least one of the negatively charged functional groups on the dye, the pH of the ink composition being maintained in the acidic region below about 7.

The ink composition of the invention evidences minimal crusting and reduced evaporation loss of water. The solubility of anionic dyes is increased in the acidic medium over that otherwise obtainable, due to the presence of the alkanol ammonium compound of amide. The ink composition of the invention is suitably employed in any of the ink-jet printers commonly in use.

22 Claims, No Drawings

INK COMPOSITIONS FOR INK-JET PRINTERS

This application is a continuation of application Ser. No. 06/866,728, filed May 27, 1986, now abandoned, which is a continuation-in-part application of Ser. No. 06/806,729, filed Dec. 5, 1985 now abandoned.

This application is related to Ser. No. 06/866,894 filed May 27, 1986, now Pat. No. 4,685,968 entitled "Process for Preparing Ink Compositions for Ink-Jet Printers", which is directed to a specific process for preparing the ink compositions disclosed and claimed herein.

BACKGROUND OF THE INVENTION

This invention relates to ink compositions for ink-jet printers, and, more particularly, to acidic aqueous-based inks.

The use of aqueous-based inks for ink-jet printers is well-known. Such compositions are relatively inexpensive and easy to prepare; typically, the ink comprises water and a glycol ether, usually diethylene glycol, and a dye. Commonly, the water and glycol ether are present in generally the same proportion and the dye, for example, Food Black 2, is present up to about 6% of the total composition, depending on the desired density of the print.

However, a persistent problem associated with aqueous-based inks is their propensity to crust over a period of time, eventually leading to plugging of the orifice in the printer mechanism from which droplets of ink are expelled in the printing operation. The crusting problem arises from the evaporation of the water from the ink solvent (vehicle) and the consequent precipitation of the dye salt which has become substantially insoluble as a result of this water loss.

The prior art inks generally use existing commercial dye salts (cation plus dye anion) as formed, which are simply dissolved in the vehicle and filtered to prepare the ink. Such dyes are designed to form solids in paper or cloth, employing such cations as sodium cations, which promote precipitation of the dye salt. Consequently, the dyes do not easily remain liquid in the orifice of an ink-jet printer.

Attempts have been made to solve the crusting problem. Hygroscopic agents have been added to reduce the rate of water evaporation by their ability to pick up water vapor from the air. Exemplary of such hygroscopic agents are water-soluble polymers, alkanol amines, amides and polyhydric alcohols.

While some improvement has been realized with these hygroscopic agents, a total solution to the crusting problems has not yet been achieved. Further, apparently no methods are known to prevent precipitation of the anionic dyes (acid dyes) in acidic aqueous-based inks.

SUMMARY OF THE INVENTION

It is an object of this invention to provide an ink in which the crusting problem is minimal.

It is a further object of this invention to provide an aqueous-based ink for ink-jet printers in which the evaporation of water is reduced.

It is another object of this invention to provide an aqueous-based ink for ink-jet printers in which the solubility of the dye in the ink solvent (vehicle) is increased.

It is yet another object of this invention to provide an aqueous-based ink for ink-jet printers in which the solubility of anionic dyes in acidic media is increased.

These and further objects of the invention will become apparent from the hereinafter following commentary.

In accordance with the invention, an aqueous-based ink composition is provided. The ink comprises (a) a vehicle of about 5 to 95% water and the balance at least one glycol ether, (b) a dye having at least one negatively charged functional group per molecule, present in an amount up to about 10% of the vehicle composition and (c) a cationic compound selected from the group consisting of alkanol ammonium compounds and cationic amide compounds, present in an amount such that there is at least one molecule of cationic compound for at least one of the negatively charged functional groups on the dye, the pH of the ink being maintained in the acidic region, or below about 7. Unless otherwise stated, composition percentages are by weight.

The ink compositions of the invention evidence minimal crusting and reduced evaporation loss of water. The solubility of anionic dyes is increased in acidic media over that otherwise obtainable, due to the presence of the alkanol ammonium compound or amide cation. The ink compositions of the invention are suitably employed in any of the ink-jet printers commonly in use.

DETAILED DESCRIPTION OF THE INVENTION

The ink compositions of the invention comprise an aqueous-based vehicle and a dye; a hygroscopic solubilizing agent is added to the ink to reduce evaporation of water and to increase the solubility of the dye in the aqueous-based vehicle, especially in acidic media. The pH of the ink is maintained in the acidic region, or below about 7.

The vehicle of the ink comprises water and at least one glycol ether, preferably of the type represented by the formula $H[O(C_nH_{2n})]_mOH$, where n is an integer of 1 to 3 and m is an integer of 1 to 4. Examples of glycol ethers include diethylene glycol, triethylene glycol and polyethylene glycols. The water is present in an amount ranging from about 5 to 95%, the balance being the glycol ether or ethers. Preferably, the vehicle comprises about 50% water and the balance the glycol ether.

To the vehicle is added up to about 10% of a dye, preferably an anionic dye (sometimes referred to as an acid dye). The amount of the dye added is a function of choice, being largely dependent upon the solubility of the dye in the vehicle (which limits the upper range of dye concentration) and the desired density of the print achieved with the ink (which limits the lower range of dye concentration—typically about 0.5%). Preferably, about 6% of the ink composition at this point comprises the dye.

The dye to which the invention is suitably applied is an organic molecule having at least one negatively charged functional group per molecule. Since sulfonate ($SO_3^-$) groups are especially benefitted from the practice of the invention, dyes having such groups are preferred. A convenient dye in this regard is Food Black 2 (FB2), which has a mixture of two, three and four sulfonate groups per molecule available for complexing. (The effective value is about 3.2 sulfonate groups per molecule for commercially available FB2.)

The negative charge of the sulfonate group is most commonly balanced by the presence of positively charged sodium (Na+). Other anionic dyes may also be suitably employed, since, as will be discussed in further detail below, the solubility of the anionic dyes is increased in acidic media by employing the teachings of the invention.

Examples of other acidic dyes which may be employed in the ink composition disclosed herein include Direct Red 9, Direct Red 227, Acid Yellow 23, Direct Yellow 86, Acid Blue 9, Direct Blue 86 and Acid Blue 185. All such anionic dyes include sulfonate functional groups, and are not otherwise soluble in acidic media, tending to precipitate out as the pH is lowered.

In accordance with the invention, the ink composition includes a cationic compound selected from the group of alkanol ammonium compounds and cationic amide compounds. Alkanol ammonium cations are represented by the formula $HN^+RR'R''$, where at least one of R, R' and R'' comprises a carbon chain having from 1 to 5 carbon atoms, with an alcohol group (—OH) associated with at least one of the carbon atoms. To the extent that one or more of the R groups is not an alkanol group, that group may comprise an alkyl. The anion is commonly chloride (Cl−), although other anions may also be employed to form the alkanol ammonium compounds; indeed, any anion may be suitably employed so long as it can effectively transport through a reverse osmosis membrane. Examples of such other anions include sulfate ($SO_4^{-2}$), nitrate ($NO_3^-$), acetyl ($CH_3CO_2^-$) and phosphate ($PO_4^{-3}$).

While up to 5 carbon atoms are permitted, use of higher carbon-containing R groups tends to defeat the purpose of the invention, namely, solubilizing the dye. Further, although each of the carbon atoms in a given R group may be associated with at least one alcohol group, higher order alcohols have a higher viscosity than lower order alcohols, so that, for example, diols are preferred over triols. The viscosity of the final ink composition should be maintained at or below about 50 cp at 25° C.

An example of an alkanol ammonium cation suitable in the practice of the invention is the triethanol ammonium cation, which has the formula $HN^+(C_2H_5OH)_3$ (here, $R=R'=R''=C_2H_5OH$), referred to herein as TEAH+. This cation, which exemplifies the class of cations in the compounds in accordance with the invention, increases the solubility characteristics of the dye by exchanging the positively charged sodium ions associated with the sulfonate group on the dye with alkanol ammonium cations.

The alkanol ammonium compounds employed in the practice of the invention reduce loss of water due to their hygroscopic nature. Further, the alkanol ammonium compounds keep the dye solubilized in acidic media, due to protonation of the amine cation. Other examples of alkanol ammonium cations suitably employed in the practice of the invention include the diethanol ammonium cation and monoethanol ammonium cation.

Cationic amide compounds may alternatively be employed in place of the alkanol ammonium compounds. Cationic amide compounds have the general formula $R-C(O)-NH_3^+.$

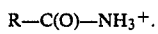

An example of a suitable cationic amide compound is the protonated form of formamide which has the formula $HO-C(O)-NH_3^+.$

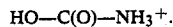

Cationic amides and alkanol ammonium cations of the type described herein may be termed bifunctional amine cations.

If the pH of the ink becomes sufficiently high to restrict protonation of the bifunctional amine cation, then the anionic dye may not sufficiently associate with this cation. This would diminish the effect that the cation has on enhancing dye solubility. Accordingly, the pH is desirably maintained below a value of about 7.

The foregoing ink compositions are suitable for use without further considerations in most types of ink jet printers. However, for thermal ink-jet printers, there is an additional consideration. As noted above, commercially available FB2 has a maximum of four sulfonate groups. If all sodium cations associated with all sulfonate groups are replaced by bifunctional amine cations, then a process known as kogation occurs. Kogation, which is a coined term unique to thermal ink jet printing, is used to describe the decomposition of the dye which results from heating to a high temperature by the hot resistor used to "fire" bubbles of ink toward the paper substrate. Kogation is highly dependent upon a number of variables, one of which is the degree of cation substitution using TEAH+ and FB2. Other cations, dyes and vehicles and other operating conditions will affect the dependence of kogation on cation substitution.

For FB2, kogation has been found to be acceptable for approximately equal sodium cations and triethanol ammonium cations (TEAH+) Kogation is most apparent where all sodium ions are replaced and is less apparent where no sodium ions are replaced. Kogation has been found for the TEAH+/FB2 system to be acceptable for replacement of less than about 75% of the sodium ions. Thus, although at least one sodium cation per dye molecule should be replaced by the bifunctional amine cation, so as to reduce evaporation of water and increase the solubility of the dye, preferably not all sodium cations per molecule should be so replaced, since it is desired to minimize kogation.

Preparation of the ink composition of the invention is preferably accomplished by use of reverse osmosis (ultrafiltration). While ion exchange processes may be employed, such processes are more complex than the reverse osmosis process.

Briefly, the preferred rocess involves forming a solution of the anionic dye with a bifunctional amine cation with chloride anion, such as TEAH+Cl−, in an acidic medium, such as provided by HCl, and applying reverse osmosis to the feed so as to drive excess sodium and chloride ions across the polymer membrane of the reverse osmosis apparatus. As is well-known, the material passing through the membrane is called the "permeate"; that which is left behind is called the "concentrate". The concentrate is cycled repeatedly through the reverse osmosis membrane to replace the sodium cations on the dye molecules with the bifunctional amine cations. Water is added as necessary. A solution of the dye in water may be preliminarily subjected to reduce the sodium cation concentration, since commercial grade dyes include impurity amounts of sodium chloride and sodium sulfate.

In the reverse osmosis process as applied to the foregoing composition, the concentrate has dye anions/sodium cations, bifunctional amine (e.g., triethanol ammonium cations/chloride anions), sodium cations/chloride anions and water, while the permeate has sodium and chloride ions, water and a trace amount of other ions that are primarily retained in the concentrate. The process is continued until the dye has a concentration such that addition of one or more glycol ethers to the concentrate results in the desired ink composition (water, glycol ether, dye and bifunctional amine), as described above. The pH is then adjusted as appropriate with, e.g., HCl to make more acidic or with, e.g., NaOH to make more basic. However, in any event, the pH is maintained below about 7, as discussed above.

Pressure is applied to force undesired species through a reverse osmosis membrane. This membrane is typically a polymer, such as cellulose acetate, available under the tradename "Super 50" from Osmonics (Hopkins, MN), or polysulfone, available under the tradename G-50 from De-Sal (Escondido, CA).

The applied pressure depends primarily upon the type of membrane and its physical configuration. For example, spiral bound membranes will require different operating parameters than plate membranes. Thus, the pressure is best expressed in terms of permeate flow rate units, or volume per unit area per unit time.

Higher pressures result in higher efficiencies (as measured by the amount of dye remaining at the end of the process having at least one sodium cation replaced by at least one bifunctional amine cation). However, higher pressures also tend to force dye molecules through the molecular filter. Thus, the pressure can be varied according to desired efficiencies of dye retention and time of processing required.

In the reverse osmosis process, the initial charge may comprise dye, e.g., FB2, and water, in order to minimize Na+ as much as possible, due to the presence of the impurity amounts of sodium-containing compounds in commercial grade FB2. The reverse osmosis process is operated for at least about 1 hour, and preferably about 3 hours. Consistent with the considerations above, a permeate flow rate of about 0.5 to 10 lbs/sq.ft.-day using about 3 to 15% by mass concentration of dye is preferred.

The bifunctional amine caiion, e.g., TEAH+, is next added and the pH reduced below about 7, and preferably to about 3. The ratio of TEAH+ is based on the considerations discussed earlier. A suitable starting ratio consistent with these considerations is about 1.25 to 1.5 times the Na+ concentration. Water is added from time to time as necessary to replaced that lost in the process. The permeate flow rate in this portion of the process preferably ranges from about 0.2 to 5 lbs/sq.ft.-day using about 3 to 15% by mass concentration of the dye. The process is continued until the concentration of impurities in the permeate reaches a desired, specific limit. Typically, the processing time is about 15 to 40 hours.

Chloride is an appropriate anion to employ with the alkanol ammonium species, and hydrochloric acid is suitably used to reduce the pH. Alternately, TEAH+Cl− may be used to reduce the pH.

Finally, the dye is concentrated by the reverse osmosis process. The concentration of the dye is chosen such that upon addition of the glycol, the desired final concentration of the dye in the ink will be achieved. The concentration process usually takes less than about 1 hour.

Following removal of the composition from the reverse osmosis process, the desired glycol, as described above, is added to the composition to produce the ink composition. The pH is adjusted as necessary to maintain the ink at a pH below about 7.

The entire process is conveniently operated at room temperature.

EXAMPLES

The conversion of Food Black 2 dye from the $Na_4{}^+$-salt to the $[(EtOH)_3NH]_4{}^+$ salt was accomplished as follows:

An in-situ exchange of Na+ ions with triethanol ammonium cation, also referred to as $(EtOH)_3NH^+$, was done using an Osmonic 600 M.W. reverse osmosis membrane. The Na+Cl− salt was removed from a 6% FB2 solution in dionized water. The concentration of Na+ and Cl− ions was monitored and the process continued until the ion concentrations were in the mole ratio of about 2:1 ion to dye. The time for this process took about 1 hour.

At this point, the dye was apparently in a form in which 50% of the counter ion was $Na^{30}$ and the remainder was H+. Verification of this dye form was made by comparing the stoichiometric ratios of Na+ to dye using a $Na^{30}$ ion specific electrode. Once the mole ratio of about 2:1 was achieved, a stoichiometric excess of triethanol ammonium compound was added such that the ratio of $[(EtOH)_3NH]^+$: dye was about 5:1. Following this addition, the solution was adjusted to a pH of about 3 using HCl. Based on a $K_H = 8 \times 10^{-9}$, the ratio of $[(EtOH)_3NH]^+ : (EtOH)_3N$ was about $10^5:1$, as calculated from the equations:

$$K_b = 1.25 \times 10^{-6} = [OH^-][TEAH^+]/[TEA]$$

$$K_H = 8.00 \times 10^{-9} = ([H^+][TEA]/[TEAH^+]) \times ([TEAH^+]/[TEA]) = [H^+]/8.00 \times 10^{-9}$$

The foregoing process ensured that all of the triethanol ammonium species was ionized and available as a counter ion. Immediately following this addition of triethanol ammonium compound, the concentrations of both $Na^{30}$ and Cl− increased The Cl− concentration increase was due to the presence of TEAH+Cl− or the addition of HCl, either or both of which were used to adjust pH. The $Na^{30}$ increase was due, it was assumed, to the "liberation" of previously bound $Na^{30}$ ions by competitive ionic association of $[(EtOH)_3NH]^+$ with the FB2 anion. The reverse osmosis process was carried out until the mole ratio of about 2:1 of ion to dye was again reached.

In contrast to the first purification step, however, this second purification step generated a lower offset concentration of $Na^{30}$ and Cl−, because of the cation exchange for $Na^{30}$ by $[(EtOH)_3NH]^+$. This process may be iterated as many times as desired, until enough partitioning has occurred to remove virtually all the $Na^{30}$ ions. In practicality, the economics of time constraints control the number of iterations. In the present example, the reverse osmosis process was terminated when the resultant mole ratio of $Na^{30}$:FB2 was 1:1.4 and the mole ratio of Cl− to FB2 was 1:333.

Water was subsequently extracted from the solution containing the substituted dye until the resulting dye concentration reached 12 wt%, as determined by visible spectroscopy. (This process was accomplished by continually extracting water from the concentrate using the reverse osmosis process.) An equal amount (by weight) of diethylene glycol (DEG) was added to the concentrated liquor resulting in a final substituted dye concentration of 6% and a 50% DEG-50% water vehicle.

The Table below summarizes kogation and crusting data relating to various concentrations of FB2 dye in various vehicles treated in accordance with the above-described process, with various degrees of sodium cation replacement by TEAH. For comparison, an ink with untreated FB2 dye is included. The concentration is given in molality, for ease of comparison. It should be noted that a molality of $(Na)_4FB2$ dye of 0.073 is equivalent to a concentration of about 6%. The pH of all inks was maintained between about 6 and 7.

TABLE

| | Various Dye-TEA Combinations, with Kogation and Crusting Results | | | |
|---|---|---|---|---|
| | Dye | Molality | Kogation | Crusting |
| | Vehicle: 50/50 $H_2O$/DEG | | | |
| 1 | $(Na)_4FB2$ (untreated) | 0.073 | Excellent | 1 |
| 2 | $(Na)_4FB2$ | 0.073 | Excellent | 2 |
| 3 | $(Na)_4FB2$ | 0.037 | " | 4 |
| 4 | $(Na)_4FB2$, TEA.HCl | 0.073, 0.037 | " | 2 |
| 5 | $(Na)_4FB2$, TEA.HCl | 0.073, 0.073 | " | 2 |
| 6 | $(Na)_4FB2$, TEA.HCl | 0.073, 0.36 | " | 2 |
| 7 | $(Na)_4FB2$, $(TEA)_4FB2$ | 0.026, 0.011 | " | 5 |
| 8 | $(Na)_4FB2$, $(TEA)_4FB2$ | 0.018, 0.018 | " | 5 |
| 9 | $(Na)_4FB2$, $(TEA)_4FB2$ | 0.029, 0.044 | " | 3 |
| 10 | $(Na)_4FB2$, $(TEA)_4FB2$ | 0.022, 0.051 | " | 3 |
| 11 | $(Na)_4FB2$, $(TEA)_4FB2$ | 0.011, 0.026 | " | 5 |
| 12 | $(Na)_4FB2$, $(TEA)_4FB_2$ | 0.015, 0.058 | Unacceptable | 5 |
| 13 | $(Na)_4FB2$, $(TEA)_4FB_2$ | 0.018, 0.055 | — | 5 |
| 14 | $(TEAH)_4FB2$ | 0.073 | Unacceptable | 5 |
| | Vehicle: 20/80 $H_2O$/DEG | | | |
| 15 | $(Na)_4FB2$ | 0.0365 | Excellent | 4 |
| 16 | $(Na)_4FB2$, $(TEA)_4FB2$ | 0.018, 0.018 | Marginal | 5 |
| 17 | $(Na)_4FB2$, $(TEA)_4FB2$, | 0.027, 0.009 | Unacceptable | 5 |

With regard to kogation, it is seen that kogation is unacceptable for replacement of greater than about 75% of the sodium ions. Also, there appears to be some dependency of kogation on the vehicle.

With regard to orifice crusting, where 1 represents the worst case and 5 the best case, it is seen that the tetraethanol ammonium form of FB2 evidenced a significant improvement with orifice crusting when compared to the tetrasodium form. In general, results of orifice crusting experiments indicated that as lower polarity cations were exchanged for $Na^{30}$, the propensity for orifice crusting was diminished. In fact, substantial differences were even observed between the monoethanol ammonium cation and the triethanol ammonium cation.

Solubility curves showed substantially enhanced solubilities for the triethanol ammonium cation in both water and diethylene glycol. Although it may be apparent that this enhanced solubility was responsible for the improvement in orifice crusting, it should be noted that additionally, a substantial amount of hygroscopicity was introduced with the triethanol ammonium compound due, in large part, to the moiety of the hydroxides on the cation. The affinity that the dye had for water was so high that the dessicated dye powder rapidly became a tar when exposed to an ambient relative humidity of 30% for less than one hour.

Thus, there has been disclosed an ink composition for use in ink-jet printers which evidences substantially no orifice crusting due to dye precipitation. The ink composition, which employs a cationic compound selected from the group consisting of alkanol ammonium compounds and cationic amide compounds, may be provided with an anionic dye in a low pH medium without precipitation of the dye. Various modifications and changes will make themselves available to those of ordinary skill in the art, and all such changes and variances not deviating from the spirit and essence of the invention are intended to be covered by the appended claims.

What is claimed is:

1. An ink composition suitable for use in ink-jet printers comprising:
   (a) a vehicle comprising about 5 to 95% water and the balance at least one glycol ether; and
   (b) a dye having at least one negatively charged functional group per molecule with which a first cationic species is originally associated, said dye present in an amount of about 0.5 to 10% of the vehicle composition, at least a portion of said first cationic species associated with said negatively charged functional groups replaced with a second cationic species selected from the group consisting of protonated alkanol ammonium ions and protonated amides such that there is one of said cationic species ionically associated with each of said negatively charged functional groups on said dye, the pH of the ink being maintained in the acidic region below about 7.

2. The ink composition of claim 1 wherein said glycol ether has a formula given by $$H[O(C_nH_{2n})]_mOH,$$

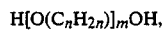

where n is an integer of 1 to 3 and m is an integer of 1 to 4.

3. The ink composition of claim 2 wherein said glycol ether is selected from the group consisting of diethylene glycol, triethylene glycol and polyethylene glycols.

4. The ink composition of claim 3 wherein said glycol ether consists essentially of diethylene glycol.

5. The ink composition of claim 4 wherein said vehicle comprises about 50% water and the balance diethylene glycol.

6. The ink composition of claim 1 wherein said dye comprises an anionic dye including at least one sulfonate functional group.

7. The ink composition of claim 6 wherein said dye is selected from the group consisting of Food Black 2, Direct Red 9, Direct Red 227, Acid Yellow 23, Direct Yellow 86, Acid Blue 9, Direct Blue 86 and Acid Blue 185.

8. The ink composition of claim 7 wherein said dye consists essentially of Food Black 2.

9. The ink composition of claim 1 wherein said protonated alkanol ammonium ion includes a cation represented by the formula $HN^+RR'R''$, where at least one of R, R', and R" comprises a carbon chain having from 1 to 5 carbon atoms, with an alcohol group associated with at least one of said carbon atoms.

10. The ink composition of claim 9 wherein said protonated alkanol ammonium ion includes triethanol ammonium cation having the formula $HN^+(C_2H_5OH)_3$.

11. The ink composition of claim 1 wherein said dye consists essentially of Food Black 2 and said protonated cationic species comprises triethanol ammonium cation, said cationic species present in an amount such that less than 4 sodium ions associated with sulfonate groups on said dye molecule are displaced by said triethanol ammonium cations.

12. A process for improving the properties of an ink composition for ink-jet printers, said ink composition comprising a vehicle and a dye, said vehicle comprising about 5 to 95% water and the balance a glycol ether, said dye including negatively charged functional groups having a first cationic species ionically associated therewith, wherein the improvement comprises replacing at least a portion of said first cationic species with a second cationic species, said second cationic species selected from the group consisting of protonated alkanol ammonium ions and protonated amides such that there is one of said cationic species ionically associated with each of said negatively charged functional groups on said dye, the pH of said ink being maintained in the acidic region below about 7.

13. The process of claim 12 wherein said glycol ether has a formula given by $H[O(C_nH_{2n})]_mOH$, where n is an integer of 1 to 3 and m is an integer of 1 to 4.

14. The process of claim 13 wherein said glycol ether is selected from the group consisting of diethylene glycol, triethylene glycol and polyethylene glycols.

15. The process of claim 14 wherein said glycol ether consists essentially of diethylene glycol.

16. The process of claim 15 wherein said vehicle comprises about 50% water and the balance diethylene glycol.

17. The process of claim 12 wherein said dye comprises an anionic dye including at least one sulfonate functional group.

18. The process of claim 17 wherein said dye is selected from the group consisting of Food Black 2, Direct Red 9, Direct Red 227, Acid Yellow 23, Direct Yellow 86, Acid Blue 9, Direct Blue 86 and Acid Blue 185.

19. The process of claim 18 wherein said dye consists essentially of Food Black 2.

20. The process of claim 12 wherein said protonated alkanol ammonium ion includes a cation represented by the formula $HN^+RR'R''$, where at least one of R, R', and R" comprises a carbon chain having from 1 to 5 carbon atoms, with an alcohol group associated with at least one of said carbon atoms.

21. The process of claim 20 wherein said protonated alkanol ammonium ion includes triethanol ammonium cation having the formula $HN^+(C_2H_5OH)_3$.

22. The process of claim 12 wherein said dye consists essentially of Food Black 2 and said protonated cationic species comprises triethanol ammonium cation, said cationic species present in an amount such that less than 4 sodium ions associated with sulfonate groups on said dye molecule are displaced by said triethanol ammonium cations.

* * * * *